United States Patent [19]

Koya et al.

[11] Patent Number: 5,295,219
[45] Date of Patent: Mar. 15, 1994

[54] SUPPORTING MEMBER FOR OPTICAL FIBER COUPLER

[75] Inventors: Kazuo Koya; Tsuneo Mori; Yukio Fujimaki, all of Gunma, Japan

[73] Assignee: Shin-Etsu Chemical Co., Ltd., Tokyo, Japan

[21] Appl. No.: 969,087

[22] Filed: Oct. 30, 1992

[30] Foreign Application Priority Data

Nov. 6, 1991 [JP] Japan .................................. 3-289603

[51] Int. Cl.$^5$ ................................................ G02B 6/26
[52] U.S. Cl. ........................................ 385/134; 385/96
[58] Field of Search ................ 385/15, 20, 27, 39, 385/42, 43, 48, 50, 51, 95, 96, 99, 134; 65/4.1, 4.2, 4.3

[56] References Cited

U.S. PATENT DOCUMENTS

| | | | |
|---|---|---|---|
| 5,066,087 | 11/1991 | Yamauchi et al. | 385/43 |
| 5,095,516 | 3/1992 | Sasaki et al. | 385/43 |

FOREIGN PATENT DOCUMENTS

| | | | |
|---|---|---|---|
| 3741284 | 6/1989 | Fed. Rep. of Germany . | |
| 2-199413 | 8/1990 | Japan | 385/43 |

OTHER PUBLICATIONS

Patent Abstracts of Japan, vol. 14, No. 78, Feb. 14, 1990, & JP 12 95 211 (Furukawa Electric).
Patent Abstracts of Japan, vol. 15, No. 198, (P-1204) May 22, 1991, & JP A 30 48 803 (Japan Aviation Electron).

*Primary Examiner*—Rodney B. Bovernick
*Assistant Examiner*—John Ngo
*Attorney, Agent, or Firm*—McAulay Fisher Nissen Goldberg & Kiel

[57] ABSTRACT

Herein provided is a support member for supporting an optical fiber coupler formed by arranging a plurality of optical glass fibers parallel to one another, then welding and drawing a part thereof wherein a long and thin reinforcing material of quartz whose external is at least partially formed into a circular shape is accommodated in a cylindrical metal case while coming the material into contact with the inner wall of the case; the optical fiber coupler is arranged along the reinforcing material; a portion of the optical fiber coupler which is not welded and drawn comes in contact with the reinforcing material and a part of the contact portion of the optical coupler is fixed to the material with an adhesive.

2 Claims, 2 Drawing Sheets

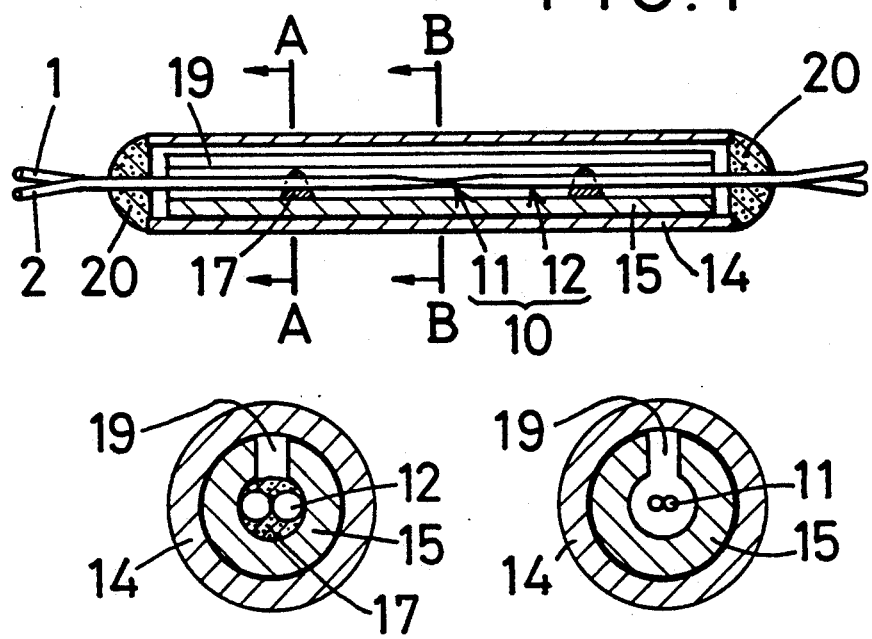
FIG. 1
FIG. 1A
FIG. 1B
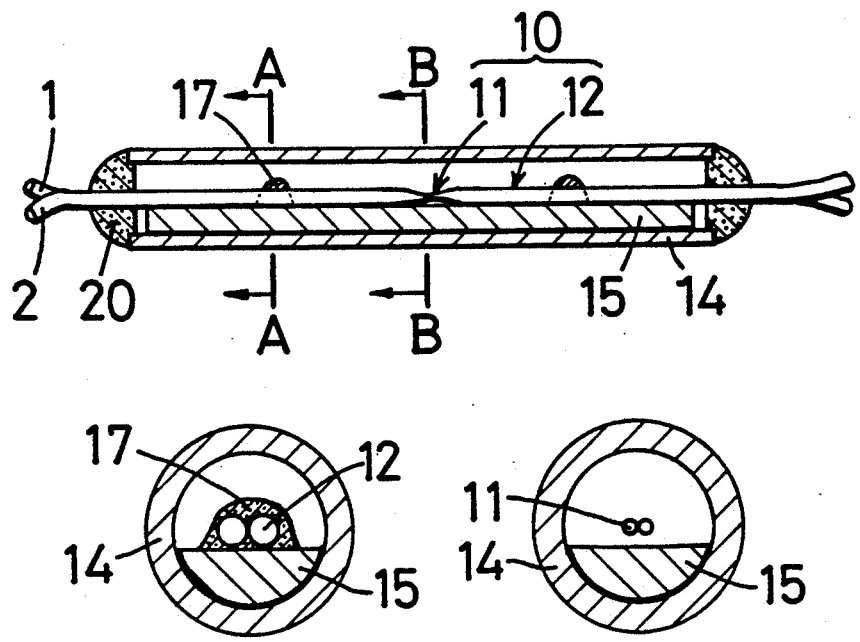
FIG. 2
FIG. 2A
FIG. 2B

SUPPORTING MEMBER FOR OPTICAL FIBER COUPLER

BACKGROUND OF THE INVENTION

The present invention relates to a member for supporting an optical fiber coupler used for separating, coupling, branching or combining light signals in an optical fiber communication system while preventing any damage of the optical fiber coupler.

An optical fiber communication system in general makes use of an optical fiber coupler as an important elemental part for separating, coupling, branching or combining light signals transmitting through the optical fibers. Such an optical fiber coupler is disclosed in, for instance, Japanese Patent Provisional Publication No. 63-271208. The optical coupler disclosed in this patent is produced by bundling a plurality of optical fibers arranged parallel to one another, welding these fibers together through heating and then drawing the welded fiber bundle so as to have a tapered welded portion having a small diameter. The tapered portion of small diameter serves to separate, couple, branch and/or combine the light signals passing through the optical fibers.

The optical fiber coupler thus produced has a low mechanical strength at the welded portion of small diameter. Moreover, the performance characteristics thereof is unstable since it suffers from changes in various properties such as coupling ratio of light signals when only a low external force is applied to the welded portion of small diameter. For this reason, there has been proposed a structure or method for reinforcing the optical coupler which comprises adhering both ends of the welded thin portion of the optical coupler to a tool and accommodating the assembly in a body of equipment (see, for instance, the aforementioned patent).

However, it has been found that the use of such a reinforcing structure often accompanies an excess loss of light signals passing through the optical coupler. The inventors of this invention have investigated the cause of this drawback in detail and come to the following conclusions. In the reinforcing structure disclosed in the foregoing Japanese Patent Provisional Publication, the optical coupler is partially adhered and fixed to the tool by an adhesive and the portions of the optical fibers other than those adhered to the tool are suspended within a space. For this reason, the axes of the optical coupler and the tool deviate from one another due to slight deviations between the positions thereof to be placed during adhesion, slight deviation therebetween due to contraction during hardening the adhesive and deviation therebetween due to the difference between the thermal expansion coefficients of these two components observed during heat cycles. Such deviation between the axes of the optical coupler and the tool would become a principal cause of the foregoing excess loss.

In addition, the optical coupler of the foregoing patent is accommodated in a body of equipment after adhering it to the tool. This results in the scaling up of the reinforcing structure.

SUMMARY OF THE INVENTION

The present invention has been completed for solving the foregoing problems associated with the conventional optical couplers and, accordingly, an object of the present invention is to provide a support member for an optical fiber coupler which can ensure the reinforcement of the coupler while it is small-sized and which never causes any increase in the excess loss as discussed above.

According to the present invention, the foregoing object can effectively be accomplished by providing a support member for supporting an optical fiber coupler formed by arranging a plurality of optical glass fibers parallel to one another and then welding a part of these optical fibers and drawing a part of the welded optical fibers wherein a long and thin reinforcing material of quartz whose external is at least partially formed into a circular shape is accommodated in a cylindrical metal case while coming the material into contact with the inner wall of the case; the optical fiber coupler is arranged along the reinforcing material; a portion of the optical fiber coupler which is not welded and drawn comes in contact with the reinforcing material; and a part of the contact portion of the optical coupler is fixed to the material with an adhesive.

BRIEF DESCRIPTION OF THE DRAWINGS

FIG. 1, 1A & 1B are cross-sectional views showing an embodiment of the support member for supporting an optical fiber coupler according to the present invention;

FIG. 2, 2A & 2B cross-sectional views showing another embodiment of the support member for supporting an optical fiber coupler according to the present invention.

DETAILED EXPLANATION OF THE INVENTION

Figure 3:
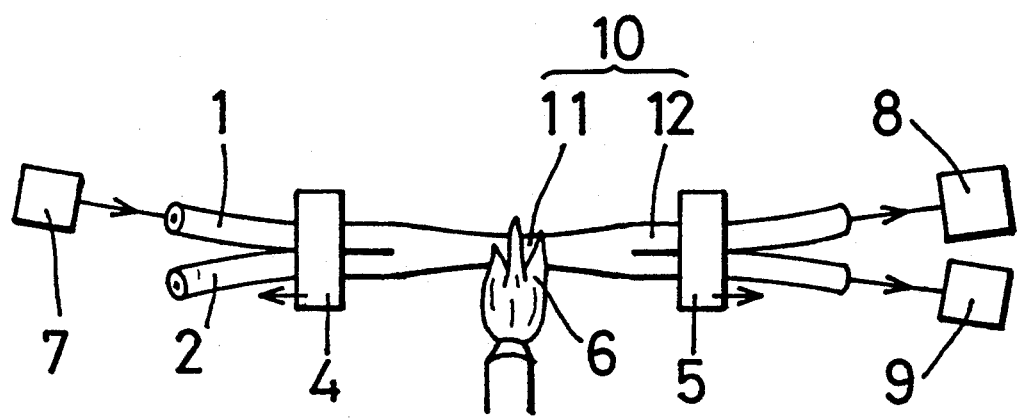
FIG. 3 is a schematic diagram for explaining processes for producing an optical fiber coupler.

The support member for supporting an optical fiber coupler according to the present invention will be detailed below with reference to the accompanying drawing (FIG. 1) which corresponds to an embodiment of the present invention.

The optical fiber coupler supported by the support member according to the present invention is formed by arranging a plurality of optical glass fibers (1 and 2) parallel to one another and welding a part of these optical fibers and drawing a part 11 of the welded portion thereof. In the support member, a long and thin reinforcing material 15 of quartz whose external is at least partially formed into a circular shape is accommodated in a cylindrical metal case 14 while coming the material into contact with the inner wall of the case, an optical fiber coupler 10 is arranged along the reinforcing material 15, a portion 12 of the optical fiber coupler which is not welded and drawn comes in contact with the reinforcing material 15 and a part of the contact portion of the coupler is fixed to the material with an adhesive 17 (see the attached cross-sectional view taken along the line A—A).

According to this structure, the axes of the reinforcing material 15 and the cylindrical metal case 14 never deviate from one another since the thin and long reinforcing material 15 of quartz is accommodated in the cylindrical metal case 14 so as to come in contact with the inner wall of the case. In addition, the portion 12 of the optical fiber coupler 10 which is not welded and drawn is placed along the reinforcing material 15 and comes in contact with the material and a part of the contact portion of the optical coupler is fixed to the material with an adhesive 17. For this reason, any strain due to, for instance, vibration and distortion in the axial direction is not applied to the optical fiber coupler 10 positioned within the cylindrical metal case 14 along the reinforcing material 15 and thus the coupler is adhered to the reinforcing material without causing any local deviation of the axes thereof and any bending. As a result, the optical fiber coupler 10 does not show any increase in the excess loss and can maintain low loss characteristics peculiar to the optical fiber coupler.

The present invention will hereinafter be explained in more detail with reference to the following Embodiments, but the present invention is by no means limited to these specific Embodiments.

FIG. 1 is a cross-sectional view showing an embodiment of the support member for supporting an optical fiber coupler according to the present invention. The support member shown in FIG. 1 comprises a cylindrical metal case 14 made from aluminum and a thin and long cylindrical reinforcing material 15 of quartz which has a notch 19 formed on the side wall thereof and is accommodated in the aluminum case 14. An optical fiber coupler 10 is positioned within the cylindrical reinforcing material 15.

The optical fiber coupler 10 can be produced according to a method as shown in FIG. 3. More specifically, the entire outer surfaces of two single-mode optical glass fibers 1 and 2 are covered with a plastic coating material for protection. Thus, the coating material was, in advance, removed from the portions of these optical fibers to be welded and then these optical fibers are fixed by clamps 4 and 5 so that these fibers are in close contact with one another. The portions of the optical fibers from which the coating material has been removed are heated by a flame 6 to weld these fibers. Then the optical fibers are drawn in the axial direction by shifting the clamps 4 and 5. In this respect, the drawing of the optical fibers is performed while detecting the coupling ratio by making a light of a desired wavelength emitted from a light source 7 incident upon the optical fiber 1, detecting the light outputted from the other end of the optical fiber 1 with a photodetector 8 and simultaneously detecting the light outputted from the end of the optical fiber 2 with a photodetector 9. The drawing operation is interrupted when the coupling ratio of the optical coupler reaches a desired level.

The optical fiber coupler 10 thus produced is then introduced into the cylinder of the reinforcing material 15 made from quartz through the notch 19. In addition, an adhesive is injected into the cylinder through the notch 19 to fix the fibers at two positions on the portion 12 of the optical fiber coupler 10 which is not welded and drawn. The resulting assembly is inserted into the cylindrical metal case 14 and the outer surface of the reinforcing material 15 is bonded to the inner wall of the case 14 through a layer of an adhesive. Both ends of the case 14 are sealed with an adhesive 20 to thus fix, to the case 14, the portion 12 of the optical fiber coupler 10 which is not welded and drawn through the adhesive 20.

As shown in the attached cross-sectional view taken along the line A—A (FIG. 1), the optical fiber coupler 10 comes in contact with the reinforcing material 15 at the portion 12 of the optical fiber coupler 10 which is not welded and drawn, or through the plastic coating material for protection and a part of the portion of the coupler which is in contact with the reinforcing material is fixed to the material by an adhesive 17. As shown in the attached cross-sectional view taken along the line B—B (FIG. 1), however, the portion 11 of the optical fiber coupler 10 which is welded and drawn is maintained in the state suspended in the space formed within the reinforcing material without coming in contact with the reinforcing material 15.

It was confirmed, by the following experiments, that the support member according to the embodiment shown in FIG. 1 exhibited desired properties.

There was provided a reinforcing material 15 comprising a quartz glass tube having an outer diameter of 2 mm, an inner diameter of 1.5 mm and a length of 43 mm and having a slit (notch 19) of 0.5 mm formed on the side thereof in the longitudinal direction and an optical coupler 10 produced according to the method discussed above was introduced into the reinforcing material 15. The optical coupler 10 was adhered and fixed to the reinforcing material 15 using an ultraviolet-curing adhesive 17. The resulting assembly was inserted into an aluminum tubular case 14 having an outer diameter of 2.5 mm, an inner diameter of 2.1 mm and a length of 45 mm, adhered and fixed thereto so that the former comes in contact with the inner wall of the latter and the both ends of the case were sealed with an adhesive 20. The excess loss of the optical fiber coupler 10 thus reinforced and supported by the support member was found to be 0.09 dB. The same optical fiber coupler 10 free of such reinforcement likewise had an excess loss of 0.09 dB. This clearly indicates that the foregoing reinforcement does not become a cause of an increase in the excess loss.

FIG. 2 is a cross-sectional view showing another embodiment of the support member for the optical fiber coupler according to the present invention. The support member shown in FIG. 2 comprises a cylindrical metal case 14 of aluminum and a quartz reinforcing material 15 comprising a long semicylindrical rod which is accommodated in the cylindrical metal case 14. An optical fiber coupler 10 is placed on the flat face of the semicylindrical reinforcing material 15.

As seen from the attached cross-sectional view taken along the line A—A (FIG. 2), the optical fiber coupler 10 comes in contact with the reinforcing material 15 at the portion 12 of the optical fiber coupler 10 which is not welded and drawn, or through the plastic coating material for protection and a part of the portion of the coupler which is in contact with the reinforcing material is fixed to the material by an adhesive 17. As shown in the attached cross-sectional view taken along the line B—B (FIG. 2), however, the portion 11 of the optical fiber coupler 10 which is welded and drawn is maintained in the state suspended in the space formed within the reinforcing material without coming in contact with the reinforcing material 15.

It was confirmed, by the following experiments, that the support member according to the embodiment shown in FIG. 2 exhibited desired properties.

There was provided a reinforcing material 15 formed by cutting, in half along the longitudinal axis, a quartz glass tube having an outer diameter of 1 mm and a length of 43 mm, an optical coupler 10 produced according to the method discussed above was put on the flat face of the semicylindrical reinforcing material 15 and then the optical coupler 10 was adhered and fixed to the reinforcing material 15 using an ultraviolet-curing adhesive 17. The resulting assembly was inserted into an aluminum tubular case 14 having an outer diameter of 1.5 mm, an inner diameter of 1.1 mm and a length of 45 mm, adhered and fixed thereto so that the former comes in contact with the inner wall of the latter and the both ends of the case were sealed with an adhesive 20. The excess loss of the optical fiber coupler 10 thus reinforced and supported by the support member was found to be 0.11 dB. The same optical fiber coupler 10 free of such reinforcement had an excess loss of 0.08 dB. This increment in the excess loss due to the foregoing reinforcement is very low and, therefore, the support member is practically acceptable without any problem.

As has been explained above in detail, if the support member for supporting an optical fiber coupler according to the present invention is used, the reinforcing material can be fixed to the metal case while coming the material in contact with the inner wall of the case and can be adhered thereto without causing any local bending and deviation between the axes of the optical fiber coupler and the support member. Accordingly, the use of the support member does not accompany any increase in the excess loss of the supported optical fiber coupler and thus the optical coupler can ensure the low loss characteristics peculiar thereto. Moreover, the support member of the present invention can be miniaturized since it has a structure in which the reinforcing material comes in contact with the inner wall of the case.

What is claimed is:

1. A support member for supporting an optical fiber coupler formed by arranging a plurality of optical glass fibers parallel to one another, then welding together and drawing a first portion of the plurality of optical glass fibers, the support member comprising:
    a long and thin tubular quartz reinforcing material having a wall with an inner surface forming a channel, an external surface and a notch which communicates with the channel; and
    a cylindrical metal case for receiving the reinforcing material, an inner wall of the case contacting the external surface;
    the optical fiber coupler being inserted through the notch and positioned within the channel of the reinforcing material, a second portion of the optical fiber coupler which is not welded and drawn contacting the reinforcing material, and an area of the second portion being fixed to the reinforcing material with an adhesive.

2. The support member of claim 1 wherein the adhesive is an ultraviolet-curing adhesive.

* * * * *